United States Patent [19]

Williams

[11] Patent Number: 5,903,640
[45] Date of Patent: May 11, 1999

[54] TELECOMMUNICATIONS SYSTEM FOR ESTABLISHING CONNECTIONS BETWEEN INTELLIGENT NETWORK DELIVERY POINTS AND SUBSCRIBERS REQUESTING SERVICE

[75] Inventor: Philip John Williams, Bristol, United Kingdom

[73] Assignee: GPT Limited, United Kingdom

[21] Appl. No.: 08/739,420

[22] Filed: Oct. 29, 1996

Related U.S. Application Data

[63] Continuation-in-part of application No. 08/611,500, Mar. 6, 1996, abandoned, which is a continuation of application No. 08/142,572, Oct. 22, 1993, abandoned.

[30] Foreign Application Priority Data

Nov. 16, 1992 [GB] United Kingdom ............ 9223961

[51] Int. Cl.$^6$ .................................................. H04M 3/42
[52] U.S. Cl. .................... 379/230; 379/207; 379/219
[58] Field of Search .................................. 379/201, 207, 379/209, 211, 212, 229, 230, 219, 220, 221, 242, 243

[56] References Cited

U.S. PATENT DOCUMENTS

| | | | |
|---|---|---|---|
| 5,040,208 | 8/1991 | Jolissaint | 379/201 |
| 5,311,574 | 5/1994 | Livanos | 379/209 |
| 5,311,583 | 5/1994 | Friedes et al. | 379/209 |
| 5,353,331 | 10/1994 | Emery et al. | 379/207 |
| 5,418,844 | 5/1995 | Morrisey et al. | 379/207 |
| 5,425,091 | 6/1995 | Josephs | 379/209 |
| 5,524,146 | 6/1996 | Morrisey et al. | 379/201 |
| 5,553,119 | 9/1996 | McAllister et al. | 379/207 |
| 5,625,682 | 4/1997 | Gray et al. | 379/209 |
| 5,661,790 | 8/1997 | Hsu | 379/209 |
| 5,684,866 | 11/1997 | Florindi et al. | 379/230 |
| 5,692,033 | 11/1997 | Farris | 379/209 |
| 5,761,290 | 6/1998 | Farris et al. | 379/201 |

FOREIGN PATENT DOCUMENTS

WO 92/01350  1/1992  WIPO ............ H04M 3/42

*Primary Examiner*—Scott Wolinsky
*Attorney, Agent, or Firm*—Kirschstein, et al.

[57] ABSTRACT

A telecommunications system comprises a plurality of subscriber and/or junction terminals connected to a local exchanges the local exchange having an Intelligent Network message terminal, a Service Router addressable from the local exchange via the message terminal and a Signal Transfer Point. The local exchange is able to identify an intelligent Network service request from an originating one of the plurality of subscriber and/or junction terminals and to address and transmit a message via the message terminal to the Service Router via the Signal Transfer Point. The message is readdressed and transmitted to an appropriate Intelligent Network Service Delivery Point and upon receipt of the message by the Service Delivery Point a connection between the Service Delivery Point and the originating one of the plurality of subscriber and/or junction terminals is initiated by the Service Delivery Point.

2 Claims, 2 Drawing Sheets

TELECOMMUNICATIONS SYSTEM FOR ESTABLISHING CONNECTIONS BETWEEN INTELLIGENT NETWORK DELIVERY POINTS AND SUBSCRIBERS REQUESTING SERVICE

The present application is a continuation-in-part of U.S. patent application Ser. No. 08/611,500, filed Mar. 6, 1996, now abandoned, which is a continuation of U.S. patent application Ser. No. 08/142,572, filed Oct. 22, 1993, now abandoned.

BACKGROUND OF THE INVENTION

1. Field of the Invention

The objective of the present invention is to simplify the Service Switching Point (SSP) of current Intelligent Network (IN) architecture to allow ease of implementation, and to provide a future-proof IN architecture without the constraints of Capability Sets or similar limitations.

2. Description of the Related Art

Public network exchange requirements are reviewed as are the requirements of the intelligent network components which enable access to IN services.

Typical IN services are described but details of IN service design and the provision of the Service Management platform which installs, maintains and updates the services are not provided. The Service Basement requirement is simplified in that each service is self-contained and there is no common component that accumulates the complexity of all services, as arises in the Service Control Point (SCP) of conventional IN.

Intelligent Network services are available to any terminal connected to the network; subscriber lines, Private Branch Exchange (PBX) lines, Centrex extensions or Integrated Services Digital Network (ISDN) terminals The description includes the means by which IN services are made available to terminals on analogue exchanges. Subscribers wishing to participate in interactive type IN services need a push-button telephone or equivalent facility.

Intelligent Network services are provided in such a manner that the whole of the intelligence is in the intelligent service itself. Public exchanges are required to do very little more than identify IN service codes (triggers) and send a simple message to their local IN Service Router.

All connections to intelligent services are established and controlled by the intelligent service terminal itself, his enables the avoidance of "hacking" and other types of unauthorized access; enabling the service to configure itself as it will before connecting to the caller and avoiding the need to allocate public network addresses to all the facets of intelligent network services.

News services and additional equipment may be connected to any convenient point in the public network without even notifying the adjacent exchanges. All that is required to introduce a new service is to not the local exchanges of the new service code, ie. set the tagger condition. Existing services may be enhanced or even completely restructured with no effect whatever upon the public network equipment.

SUMMARY OF THE INVENTION

According to the present invention there is provided a telecommunications system comprising; a plurality of subscriber and/or junction terminals connected to a local exchange, said local exchange having an Intelligent Network message terminals a Service Router addressable from the local exchange via the message terminal and a Signal Transfer Point (STP);

the local exchange having mans for identifying an Intelligent Network Service request from an originating one of the plurality of subscriber and/or junction terminals and for addressing and transmitting a message via the message terminal on the STP to the Service Router;

whereupon the message is readdressed and transmitted by the service Router to an appropriate Intelligent Network Service Delivery Point via the STP; and upon receipt of the readdressed message by the Service Delivery Point, a connection between the Service Delivery Point and the originating one of the plurality of subscriber and/or junction terminals is initiated by the Service Delivery Point.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
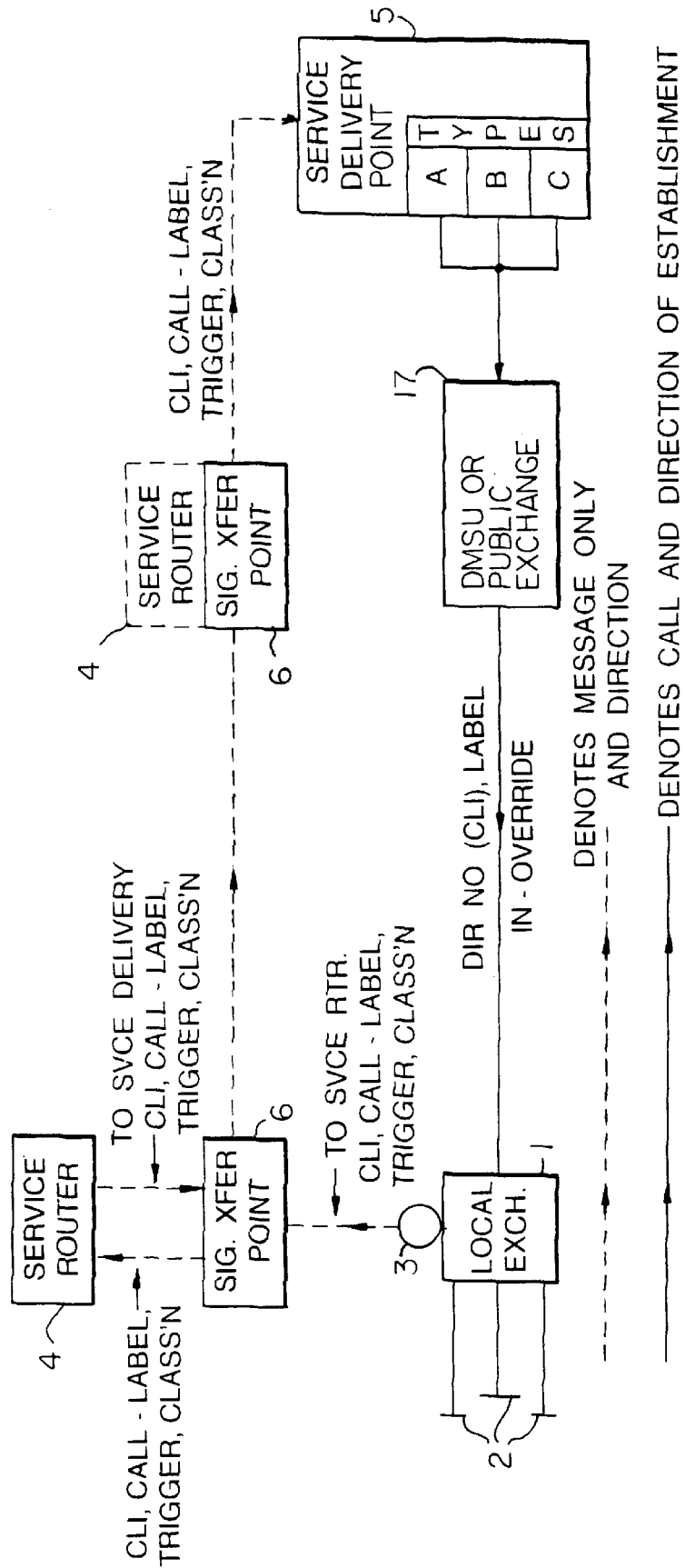
FIG. 1 shows an example of an IN Service connecting with a Local Exchange subscriber.

Referring now to FIG. 1, a local Exchange 1, having subscriber and/or junction terminals 2 connected thereto has the ability to identify calls requiring Intelligent Network services and then to transmit a message via an IN message terminal 3, addressed to a local IN Service Router 4. Signal Transfer Points 6 at the nodes of the message network forward the message to the addressed destination. The message will contain the calling subscriber's directory number (Calling Line Identity (CLI), a call-label identifying the actual call incidence, and the relevant trigger information (dialed digits etc.). A classification field will be included (Coinbox, analogue exchange terminal etc.).

The Service Router 4 simply re-addresses the message to the Service Delivery Point 5, or may re-address the message to another Service Router 4 in the country or company providing the service which will in turn re-address the message to the Service Delivery Point 5.

Upon receiving the message, the Service Delivery Point 5 will appoint a terminal to establish a can through the public network to pick-up the caller using the CLI, the call-label and the "IN override" facility. (IN overide is a variant of the existing "operator-override" facility It enables connection to a busy line but does not ring a fee line.) Within the Service Delivery Point 5, Types A, B, C are representative of the many and various possible service delivery equipment.

In the event that subsequent activity requires the call to be transferred to a different IN service, the current Service Delivery Point 5 will address a message containing the original CLI and cal-label to the new service. The message may be addressed directly to the new service or may be addressed via a Service Router 4 as before.

The new service will establish connection to the subscriber in the previously described IN override manner. The subscriber's local exchange 1 will complete the new connection and termite the previous connection.

For normal IN service traffic, no message will be returned to die local exchange 1 via the message network other than when a call fails or is rejected. Messages may be returned however if the IN services are used to provide Advise Duration and Charge (AD&C) announcements etc.

Some IN services will provide single ended services such as booking reminder calls, reading mail-boxes or setting-up incoming call profiles. Other services will enable other parties to be brought into the connection such as Multi-party calls and Broker type services; such services will employ will a multi-part bridge similar to opener services.

IN services with bridges may be daisy-chained using the technique employed to pick-up analogue exchange subscribers.

The local exchange 1 will be required to identify IN service triggers in (a)–(e) below as follows:

(a) In the digits dialled by a calling subscriber.
  i.e. certain Subscriber Trunk Dialling (STD) codes (Freephone etc.)
  certain Service Codes. (Codes of the form 1XX).
  certain supplementary service codes. (Codes of the form *nn#).

(b) When the Local Exchange 1 wishes to use IN services.
  e.g. Advise Duration and Charge (AD&C) announcement.

(c) The local exchange 1 may also be required to trigger when calls are made to certain numbers within the local numbering scheme. It may thus be necessary to enable incoming junctions to be picked-up by IN services when such numbers are dialled on incoming calls from other exchanges. This may be achieved using the same technique that enables IN services to pick-up junctions from analogue exchanges.

NOTE. Call charges for such services cannot be levied upon the caller due to the possibility of a nondigital interface preventing access to the caller's identity.
  Interactive IN services cannot intercept incoming calls from other exchanges due to the existence of rotary dial telephones, incoming international calls and similar incompatibilities. Until the world is digital, it appears that only simple diversions are applicable to incoming calls. and such services are normally within the capability of the local exchange 1 without IN assistance.

(d) Local exchange 1 may be required to trigger in response to a "drop-back-and-consult-IN" message returned during a part established call. This requirement however is improbable in that it cannot properly accommodate the situation where the drop-back message encounters a non-digital interface.

(e) Supplementary service codes causing IN triggers may be received following a recall signal from a subscriber on an established outgoing or incoming call. (e.g. Hold for Enquiry to a Freephone number). The IN service request message will be passed to the IN Service Delivery Point via the Service Router 4 as normal the trigger information within the message indicating the type of access.

If the call connection is not admissible, the Service Delivery Point 5 will return a call rejection message to the local exchange 1 via the IN message network. Alternatively a Service Delivery terminal may pick-up the caller in the normal manner to provide an announcement—then release.

If the call connection is admissible, the delivery terminal will establish a connection to the caller using the "IN-intercept" facility. This facility is similar to the IN-override facility but requires that the existing call should be intercepted rather than be replaced as would arise when a call is transferred from one IN service to another.

The message from the Local Exchange 1 to the IN Service Router 4 should contains parts (a)–(c) below as follows:

(a) The message must contain the directory number of the calling subscriber (CLI). The full STD (or International Subscriber Dialling—ISD) number should be provided as the Service Delivery Point 5 may be remote from the local area—or even overseas.

(b) The message must contain a call label enabling the call to be positively identified in the local exchange 1 when it has to be picked-up by a Service Delivery Point 5. The call label also enables the local exchange 1 to identify and individual line when the directory number indicates a PBX or Centrex line.

(c) The message must contain a field indicating the classification of the caller for use when the call may require special treatment, e.g. when information regarding variations of call charges must be returned to the caller as the call progresses (coinbox, Subscribers Private Meter (SPM), Metering-over-Junction (MOJ)).

Services like AD&C announcements which are triggered by the local exchange rather than by subscriber actions, will need additional data (e.g. the number of charge units).

AD&C announcements and similar services requested by the local exchange 1 may initially be acknowledged by the Service Delivery Point 5. After provision of the service, a new message exchange will be initiated by the delivery terminal to the local exchange indicating success or otherwise. Such messages are not detailed in this description.

The establishment of a connection between a caller and Service Delivery Point 5 will be initiated by the message terminal 3. An incomniing call to the caller's directory number will be received at the local exchange. The call set-up information will indicate the IN-overide requirement and enable access to the call-label.

The call-label will identify a particular line when the directory number indicates a PBX, and will enable the local exchange to identify that the caller has not cleared and reseized since the IN application was made.

The caller is expected to be busy and a connection between the caller and the incoming junction (Service Delivery Point 5) should be completed in a similar manner to that in which the call would normally have been connected to an outgoing junction. CONNECTION COMPLETE and ANSWER messages should be returned to the delivery terminal as appropriate. No connection should be made if the subscriber has cleared but a call failure message should be returned to the delivery terminal via the public network (incoming junction) indicating the reason.

The call record should be amended accordingly and should ensure that if a RECALL signal is subsequently received from the caller, it will result in a message being passed to the incoming junction (Service Delivery Point 5). The recall will not be handled by the local exchange. Otherwise, the call will be treated as an ordinary answered incoming call; call control will be with the IN terminal which can hold or release the connection as it pleases.

NOTE. The need to return a "recall" message to incoming junctions as specified above is a new signalling requirement; its handling will be similar to the "called subscriber clears" message.

The original call-label number must continue to be valid and may be received from another service delivery terminal if the call is subsequently to be transferred from one delivery terminal to another.

The local exchange call-control mechanism must allow that a subscriber on an established incoming call can be picked-up in the manner described, in which case the previously established connection will undergo the normal release sequence. This action will apply when a call has to be transferred from one IN service to another, and may also apply to an ordinary incoming call that originated from an IN type terminal (e.g. when IN type terminals are used to provide mobile services).

The call control mechanism should also allow IN terminals to intercept an established call as a third party (e.g. Hold-for-Enquiry to a Freephone number). In such cases the call set-up information from the delivery terminal will indicate that the existing call should be intercepted rather than replaced.

All ports of IN service delivery terminals are outgoing-only and connect to the public network via Digital Main Switching Unit (DMSU) or any convenient digital public exchange 14 and appear as incoming junctions on a digital exchange.

As will be seen from the foregoing, the described ability to identify calls requiring IN services and to transmit a message via the IN message terminal 3 and to use the described override facility simplifies the operations previously carried out by the SSP, as is referred to at the being of the description.

For accounting purposes, the administration will probably require that calls originated by the terminals arm recorded in a manner similar to lines from other network operators.

Many of the calls originated by the Service Delivery Point 5 will be ordinary outgoing calls, but the majority will require the called party to be picked-up using the IN override facility. These calls and their handling is similar to the existing "operator-override" facility and would appear to require no additional facility in the intermediate exchanges.

The only new requirement for tandem exchanges, or exchanges with Service Delivery Point 5, is to receive a RECALL message from the outgoing junction (local exchange) and pass it back to the incoming junction (Service Delivery Point 5 ). The handling of the message will be very similar to the handling of the existing "called party clears" message.

Access to IN services from analogue local exchanges will require that calls requiring such services must be routed to a digital exchange over ajunction enabling the transmission of meter signals (MOJ).

When an IN service is dialled on a junction from the analogue exchange, the digital exchange will forward a message to the IN Service Router as normal but the CLI of the caller will contain a spare directory number belonging to the digital exchange and reserved for this purposes.

The call will be picked-up by the Service Delivery Point 5 making a call to the reserved number. The call-control mechanism will identify the reserved number as indicating the requirement to pick-up an incoming junction instead of a subscriber and will use the call-label to identify the junction.

This method can be used to pick-up any incoming junction requiring IN services and can be used to daisy-chain IN services when the intermediate service enables a through connection.

The charge record for IN calls will be produced by the IN service delivery terminal and enables call charges to vary according to which aspect of the service is chosen by the caller, and to vary as the call progresses.

In order that services with variable charges can be available to coinboxes, lines with meter recorders (SPM) and subscribers on analogue exchanges, it will be necessary to enable charge control messages to be returned to the originating digital exchange from the Service Delivery Point 5.

Figure 2:
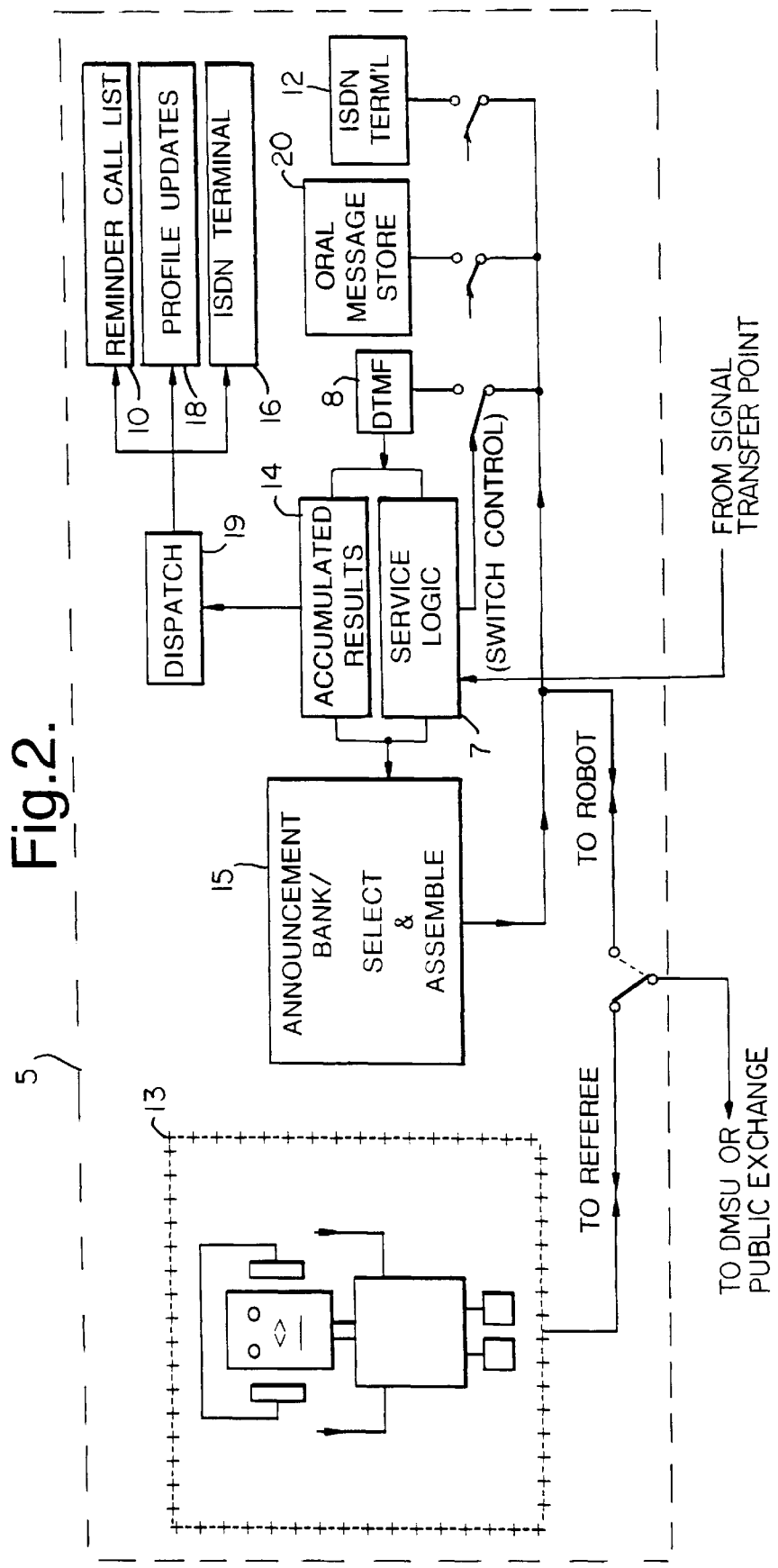
FIG. 2 shows a typical party IN service.

FIG. 2 illustrates a typical IN Service Delivery Point 5 in which a robot voice is used to interrogate the caller and gather the responses.

Having established connection to the subscriber through the public network in response to a message from Signal Transfer Point 6 connected to a Service Delivery Point logic 7 the Service Delivery Point logic 7 selects a first announcement to guide the subscriber through the relevant procedure.

The subscriber's keyed results is detected in the DTMF receiver 8 and passed to the Service Delivery Point logic 7 where it is recorded in the accumulated response 9 and used to identity the next guidance announcement from the announcement bank/select and assembler 15.

When setting-up a call diversion for his incoming calls, a subscriber may wish to record a message advising callers that their call is being tansferred and indicating how to proceed, e.g. "Your call will be forwarded to Evans coal-yard. Mr. Jones is visiting Mr. Rees in the Accounts Department". (Without such a message the caller would probably clear when his call to "Jones the Accountant" was answered by "Evans the Coal"; or would be unable to find Mr. Jones among the coals).

To this end the service logic 7 is able to replace or supplement the Dual Tone Multi-Frequency (DTMF) receiver with an oral message store 20.

At the completion of the call the service logic 7 dispatches the results to the appropriate destination. (Reminder call list 10, Profile Updated 18, etc.) via the dispatch unit 19.

Inevitably inexperience or illogical requirements will result in conflict between the robot voice and the caller. Therefore the Service Delivery Point 5 is able to call in the services of a human referee 13 to restore customer satisfaction and peace. The caller also may call in the referee 13.

FIG. 2 also shows the service logic 7 is able to participate in Integrated Service Digital Network (ISDN) activity via ISDN terminals, 12, 16. There may be no identified need for such provision at the moment, but whatever the Service Provider chooses to connect is immedeately availabe to the caller with no alteration to the public network. The fact that all call connections are initiated by the delivery terminal enables appropriate control of route selection.

What I claim is:

1. A telecommunications system, comprising: a plurality of subscriber and/or junction terminals connected to a local exchange, said local exchange having an Intelligent Network message terminal, a Service Router addressable from the local exchange via the message terminal and a Signal Transfer Point (STP);

the local exchange having means for identifying an Intelligent Network service request from an originating one of the plurality of subscriber and/or junction terminals and for addressing and transmitting a message via the message terminal and the STP to the Service Router;

whereupon the message is readdressed and transmitted by the Service Router to an appropriate Intelligent Network Service Delivery Point via the STP; and upon receipt of the readdressed message by the Service Delivery Point, a connection between the Service Delivery Point and the originating one of the plurality of subscriber and/or junction terminals is initiated by the Service Delivery Point.

2. The telecommunications system as claimed in claim 1, wherein the message includes the directory number of the originating one of the plurality of subscriber and/or junction terminals, a call identifier and an Intelligent Network service identifier.

* * * * *